United States Patent
Hufnagl et al.

(10) Patent No.: US 7,033,120 B2
(45) Date of Patent: Apr. 25, 2006

(54) BLIND FASTENER AND DRIVE NUT ASSEMBLY AND METHOD OF INSTALLATION THEREOF

(75) Inventors: Gerhart Hufnagl, Tucson, AZ (US); James W. Kendall, Tucson, AZ (US)

(73) Assignee: Huck International, Inc., Tuscon, AZ (US)

( * ) Notice: Subject to any disclaimer, the term of this patent is extended or adjusted under 35 U.S.C. 154(b) by 79 days.

(21) Appl. No.: 10/218,748

(22) Filed: Aug. 13, 2002

(65) Prior Publication Data

US 2004/0033119 A1 Feb. 19, 2004

(51) Int. Cl.
*F16B 13/04* (2006.01)

(52) U.S. Cl. .............................. 411/34; 411/43; 411/283

(58) Field of Classification Search .................. 411/34, 411/35, 36, 37, 38, 39, 43, 54, 70, 283
See application file for complete search history.

(56) References Cited

U.S. PATENT DOCUMENTS

| | | | | |
|---|---|---|---|---|
| 2,096,040 A | * | 10/1937 | Hosking | 411/187 |
| 2,282,711 A | * | 5/1942 | Eklund | 411/43 |
| 2,765,699 A | * | 10/1956 | Torre | 411/43 |
| 3,129,630 A | * | 4/1964 | Wing et al. | 411/43 |
| 3,253,495 A | | 5/1966 | Orloff | 85/70 |
| 3,493,254 A | * | 2/1970 | Summerlin et al. | 403/408.1 |
| 3,657,956 A | * | 4/1972 | Bradley et al. | 411/43 |
| 4,222,304 A | * | 9/1980 | Yoshida et al. | 411/34 |
| 4,556,351 A | * | 12/1985 | Wollar et al. | 411/38 |
| 4,659,271 A | | 4/1987 | Pratt et al. | 411/43 |
| 4,747,202 A | | 5/1988 | Beals | 29/437 |
| 4,747,204 A | * | 5/1988 | Pratt et al. | 29/523 |
| 4,752,169 A | * | 6/1988 | Pratt | 411/43 |
| 4,772,167 A | | 9/1988 | Beals | 411/43 |
| 4,778,318 A | * | 10/1988 | Jeal | 411/43 |
| 4,844,673 A | | 7/1989 | Kendall | 411/34 |
| 4,865,499 A | * | 9/1989 | Lacey | 411/34 |
| 4,877,363 A | | 10/1989 | Williamson et al. | 411/43 |

(Continued)

FOREIGN PATENT DOCUMENTS

WO WO 02/23055 A1 3/2002

*Primary Examiner*—Thomas A Beach
(74) *Attorney, Agent, or Firm*—David P. Maivald; Eckert Seamans Cherin & Mellott, LLC

(57) ABSTRACT

A blind type fastener for securing a plurality of workpieces is provided that has a sleeve, a pin member and a drive nut. The sleeve has a body that is internally threaded along a portion of the sleeve, a head positioned at one end of the sleeve and an internally unthreaded deformable tail portion positioned at the other end of the sleeve that is integrally connected to the sleeve. The head of the sleeve has a plurality of recesses disposed threreon. The pin member is adapted to be disposed within the sleeve and has a breakneck groove that is adapted to fracture at a position that is flush with an outer surface of the sleeve head. The drive nut has a plurality of projections positioned on one end of the drive nut that are adapted to be disposed in the plurality of recesses disposed in the head of the sleeve.

8 Claims, 4 Drawing Sheets

U.S. PATENT DOCUMENTS

| | | | |
|---|---|---|---|
| 4,919,577 A | 4/1990 | Binns | 411/43 |
| 4,967,463 A | 11/1990 | Pratt | 29/525.2 |
| 5,066,179 A | 11/1991 | Pratt | 411/34 |
| 5,080,545 A * | 1/1992 | McKinlay | 411/149 |
| 5,123,792 A * | 6/1992 | Strobel | 411/55 |
| 5,603,592 A * | 2/1997 | Sadri et al. | 411/34 |
| 5,816,761 A * | 10/1998 | Cassatt et al. | 411/34 |
| 6,247,883 B1 * | 6/2001 | Monserratt | 411/34 |
| 2002/0031415 A1 | 3/2002 | Cosenza et al. | 411/34 |
| 2002/0085894 A1 | 7/2002 | Cosenza et al. | 411/43 |

* cited by examiner

BLIND FASTENER AND DRIVE NUT ASSEMBLY AND METHOD OF INSTALLATION THEREOF

FIELD OF THE INVENTION

This invention relates to blind fasteners for securing workpieces together, and more particularly to a new blind fastener and drive nut assembly. A method of installing the blind fastener and drive nut assembly is also provided.

BACKGROUND OF THE INVENTION

Blind fasteners are commonly used to secure workpieces together when it is otherwise impossible to access the blind side of one of the workpieces. Typically, the workpiece that is accessible by an end-user is referred to as the accessible side workpiece and the workpiece that is inaccessible by an end-user is referred to as the blind side workpiece.

Blind fasteners have wide application in the aerospace industry. In aerospace applications, the blind fastener assembly of the present invention can be used to secure workpieces made of aluminum alloy, other metallic alloys, composites or combinations thereof.

Examples of previously available blind fasteners are disclosed in U.S. Pat. Nos. 4,967,463 and 5,066,179. The principle components of the blind fasteners of FIGS. 1–2 and 9–10 of these patents are a pin, a lock ring, a sleeve and a drive nut. Generally, the pin has the shape of an elongated shank that has a smooth or threaded portion that is adapted to be located within the workpieces to be fastened together and an externally threaded removable pin tail portion. The lock ring, the sleeve and the drive nut are disposed on the pin. The blind fastener assembly is inserted into aligned openings of workpieces that are to be secured together. After installation is complete, the pin, the lock ring and the sleeve would hold the workpieces together.

The pin has an enlarged head at one end of the shank and flats at the opposite end. The flats are wrenching surfaces that allow a tool to rotate the pin during installation of the blind fastener. The pin also has a breakneck groove at a predetermined position on the shank that defines the weakest portion on the shank. When a certain installation load is achieved, the breakneck groove prevents overloading by failing in torsional shear and the removable pin tail portion breaks away from the blind fastener assembly along with the drive nut that is threadedly engaged with the removable pin tail.

The sleeve has a head at one end of the sleeve and the body of the sleeve has a cylindrical shape. The sleeve is not internally threaded and contains a chamfer that is adapted to receive a lock ring. The body of the sleeve has a deformable tail portion that is an integral component of the sleeve and the top of the head may be abraded, coated or knurled.

The drive nut resembles a traditional hexagon nut and is internally threaded. One side of the drive nut may be abraded, coated or knurled as well. The lock ring has a bore and is adapted to be secured within the sleeve chamfer adapted to receive the lock ring.

The assembly process of the previously available blind fastener consists of the lock ring being placed on the pin, followed by the sleeve. The drive nut is then threaded onto the pin until it is seated against the head of the sleeve. The blind fastener assembly is then disposed through aligned openings in a plurality of workpieces. The installation process of the blind fastener is accomplished by use of a tool adapted to hold the drive nut stationary and that also fits over the flats on the pin. The tool prevents the drive nut from rotating, while at the same time rotates the pin. As the pin rotates, the head of the pin is pulled towards the blind side workpiece. The deformable tail portion of the sleeve abuts the outer surface of the blind side workpiece and begins to deform into a bulb by the load placed on the deformable tail portion by the head of the pin. Meanwhile, at the opposite end of the blind fastener assembly, the drive nut is engaging the head of the sleeve. As the pin is screwed tighter and tighter, the head of the sleeve begins to rotate relative to the drive nut. Such a result is undesirable from the standpoint of achieving the maximum grip capacity of the fastener. This undesirable rotation can be reduced by increasing the friction between the drive nut and the head of the sleeve by abrading, coating or knurling that portion of the drive nut and/or the head of the sleeve that is in contact with the drive nut. As can be appreciated, such friction inducing means could damage the head of the sleeve during installation as well. When the deformable tail portion of the sleeve is fully set, the pin stops rotating and the breakneck groove fails causing the removable pin tail to break off with the drive nut that is threadedly engaged with the removable pin tail.

The present invention is more economical than the prior art blind (as Leners of U.S. Pat. Nos. 4,967,463 and 5,066,179 that require use of a lock ring in FIGS. 1–2 and 9–10 because the present invention completely eliminates the use of a lock ring in the blind fastener assembly leading to a savings in the manufacture of the blind fastener assembly and avoiding complexities in function. Also, the present invention has a plurality of dimples on the outer surface of the sleeve body that are disposed thereon by a physical deformation process that places a portion of the sleeve material against the pin shank to prevent loosening of the blind fastener assembly due to vibrations. Additionally, optimum installation performance and reliability are not achieved from the prior art blind fastener because the head of the sleeve can rotate relative to the drive nut. Such rotation would cause abrasion or scraping of the sleeve head. In the embodiments that increase the friction between the drive nut and the sleeve head by abrading, coating or knurling, the friction inducing means could also damage the sleeve head of the blind fastener as well. These results are not only visually apparent, but can also deteriorate the corrosion resistant properties of the sleeve and damage the workpieces under the sleeve head. Also, the drive nut of the prior art can cause large variations in the required installation loads of a particular application due to the potential for rotation of the sleeve relative to the drive nut at high installation loads. That feature can result in a premature break at the breakneck groove and inconsistencies in the amount the deformable tail portion deforms into a bulb. These factors compromise the integrity of the blind fastener.

One solution to the problem of the sleeve rotating relative to the drive nut is through the use of a plurality of non-deformable projections on the drive nut that engage recesses in the sleeve. Such drive nuts have been proposed in U.S. patent application Ser. No. 09/825,711 (WO 02/23055), Ser. No. 09/849,184 and Ser. No. 09/997,500. The instant invention differs from the designs disclosed in these applications due to the integrally formed deformable tail portion of the sleeve that is used to form a bulb. The cited applications all use a separate deformable sleeve that is screwed on the pin. As such, the present invention eliminates the need for a separate deformable sleeve so it is more economical than the design disclosed in the cited patent applications because a component is eliminated.

Additionally, the present invention is a "flush" break blind fastener in substantially all grip ranges of the blind fastener which distinguishes the present invention from the blind fasteners of U.S. Pat. Nos. 4,967,463 and 5,006,179 and U.S. patent application Ser. Nos. 09/825,711, 09/849,184 and 09/997,500 which are not "flush" break blind fasteners in substantially all grip ranges. The term "flush" as used herein means that break off of the removable pin tail is generally at a point flush with the outer surface of the sleeve head or ±0.005 inches above or below that outer surface in substantially all grip ranges for the blind fastener assembly. Break off of the removable pin tail by ±0.005 inches is typically within aerodynamic tolerances and should rarely require a secondary shaving operation to remove the remaining portion of the pin that could project above the outer surface of the sleeve head. Conversely, the substantially flush blind fasteners of U.S. Pat. Nos. 4,967,463 and 5,006,179 and U.S. patent application Ser. Nos. 09/825,711, 09/849,184 and 09/997,500 have a break off point of the removable pin tail at a point generally flush with the sleeve head or slightly above or below that outer surface.

In those grip ranges in the cited patents and patent applications that have the removable pin tail break off at a point slightly above the point that is flush with the outer surface of the sleeve head, the protruding pin that remains must be shaved down by the end-user of the blind fastener assembly to make the pin flush with the outer surface of the sleeve head. Such an operation is costly and time consuming. Additionally, the end-user could damage the sleeve head and/or the accessible side workpiece in the shaving operation. The present blind fastener assembly will not require a shaving application in substantially all grip ranges of the blind fastener.

As can be seen, a need exists in the art for a blind fastener that eliminates the use of lock rings and separate deformable sleeve components in the blind fastener assembly. An additional need exists in the art for a blind fastener that uses a non-destructive drive nut with a plurality of projections that engage recesses in the head of the sleeve that eliminates rotation of the sleeve relative to the drive nut. A further need exists in the art for a flush break blind fastener in substantially all grip ranges for that blind fastener that does not require a subsequent time consuming shaving operation by the end-user of the blind fastener.

SUMMARY OF THE INVENTION

It is an object of the present invention to provide a blind fastener that utilizes fewer components than prior art blind fasteners.

It is another object of the present invention to provide a blind fastener that uses a drive nut that does not damage the head of the sleeve.

It is another object of the present invention to provide a flush break blind fastener in substantially all grip ranges of the blind fastener.

Certain objects of the invention are achieved by providing a blind type fastener for securing a plurality of workpieces that has a sleeve, a pin member and a drive nut. The sleeve is internally threaded along a portion of the sleeve and has a head positioned at one end of the sleeve and a deformable tail portion positioned at the other end of the sleeve that is an integral component of the sleeve. The internal surface of the deformable tail has a smooth surface. The threaded portion of the sleeve transitions to the deformable tail portion of the sleeve with a step. The head of the sleeve has a plurality of recesses disposed in the head of the sleeve. The pin member has an elongated shank wherein the shank has a straight smooth portion adapted to be received within the deformable tail portion and a threaded portion adapted to threadedly engage the sleeve. The pin member has a head positioned at one end of the pin member and the threaded portion of the pin member has a breakneck groove that separates the pin member into a portion that is adapted to remain with the fastener after being set and a removable pin tail portion that is adapted to be removed from the fastener after being set. The breakneck groove is adapted to fracture at a position that is flush with the outer surface of the sleeve head. The drive nut is adapted to be positioned on the removable pin tail portion of the pin member and has a plurality of projections positioned on one end of the drive nut that are adapted to be disposed in the plurality of recesses disposed in the head of the sleeve.

Other objects of the invention are achieved by using the blind type fastener of the present invention to secure workpieces according to the following steps: (i) inserting the fastener through aligned openings in workpieces to be fastened together until the head of the sleeve engages an outer surface of the accessible side workpiece; (ii) gripping an outer surface of the drive nut to hold the drive nut against rotation relative to sleeve; (iii) applying torque to the pin member thereby turning the pin member until the deformable tail has been bulbed and the straight smooth portion has engaged the step of the sleeve thereby stopping further movement of the pin member, the breakneck groove of the pin member moving to a position that is flush with the outer surface of the head of the sleeve; and (iv) continuing to apply torque to the pin member while holding the drive nut against rotation, thereby twisting off the removable pin tail portion of the pin member at the breakneck groove with the drive nut still positioned on the removable pin tail portion of the pin member.

DETAILED DESCRIPTION OF PREFERRED EMBODIMENTS

Figure 1:
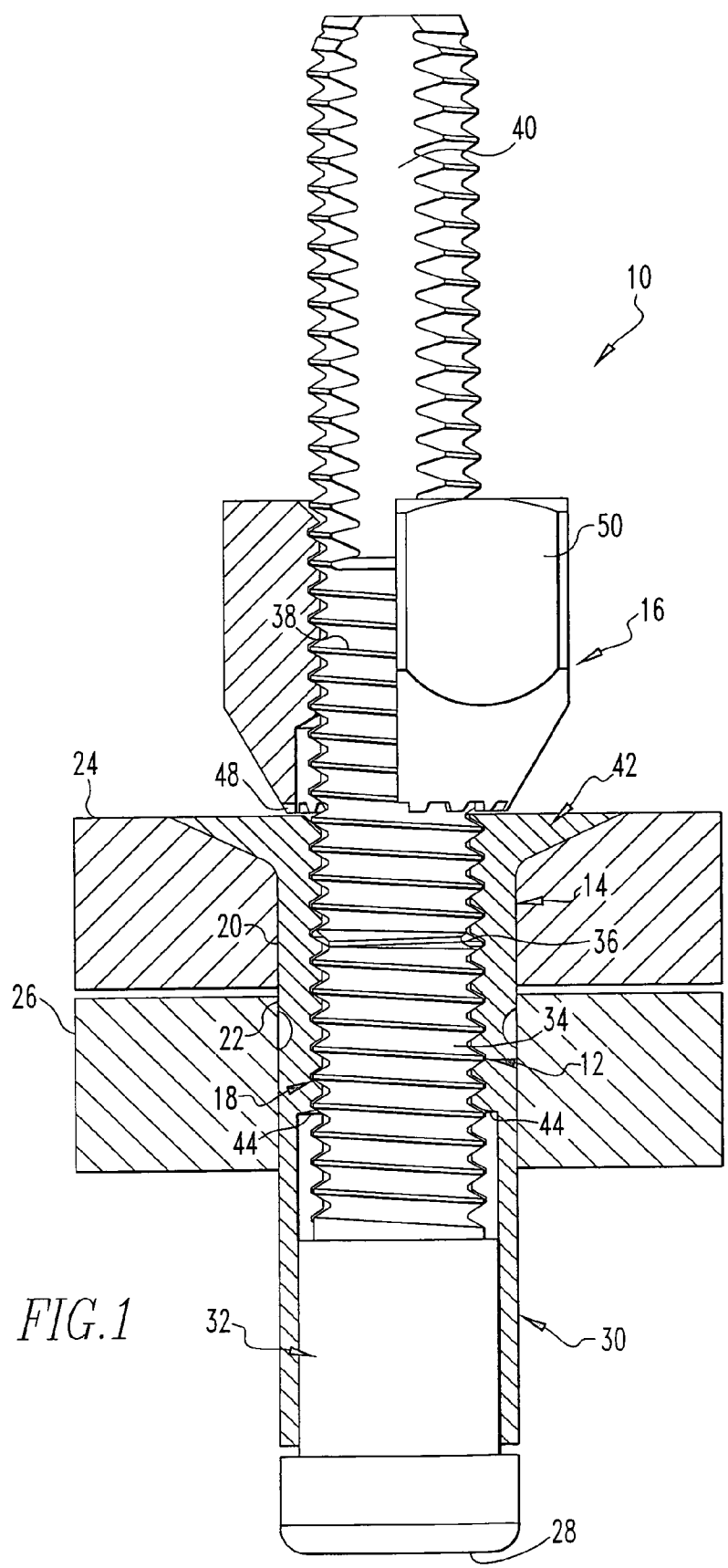
FIG. 1 is a partial cross-sectional side view of the fastener of the present invention showing the components of the fastener after the fastener has been inserted through aligned openings in a plurality of workpieces.

Looking now to FIG. 1, a fastener 10 is shown to include a pin member 12, a sleeve 14 and a drive nut 16. In the fastener industry, pin member 12 may be referred to as a bolt, a screw, a spindle or a stem and sleeve 14 may be referred to as a nut or nut body. Pin member 12 has an elongated shank 18 which extends through aligned openings 20 and 22 in a pair of workpieces 24 and 26, respectively, to be secured together. An enlarged protruding head 28 at one end of shank 18 is adapted to engage a deformable tail portion 30 that is an integral component of the sleeve 14. Adjacent the head 28, the shank 18 has a straight portion 32 which is adapted to be received within the deformable tail portion 30 of the sleeve 14. Following the straight portion 32 is a threaded portion 34.

A breakneck groove 36 is located adjacent to the threaded portion 34 and defines the weakest portion on the shank 18. Adjacent to the breakneck groove 36 is the removable pin tail portion 38 of the pin member 12 that is threaded. At the opposite end of the shank 18 are two flats 40 that provide wrenching surfaces that allow a driving tool (not shown) to engage the flats 40 and apply torque resulting in rotary movement of the pin member 12.

Figure 3:
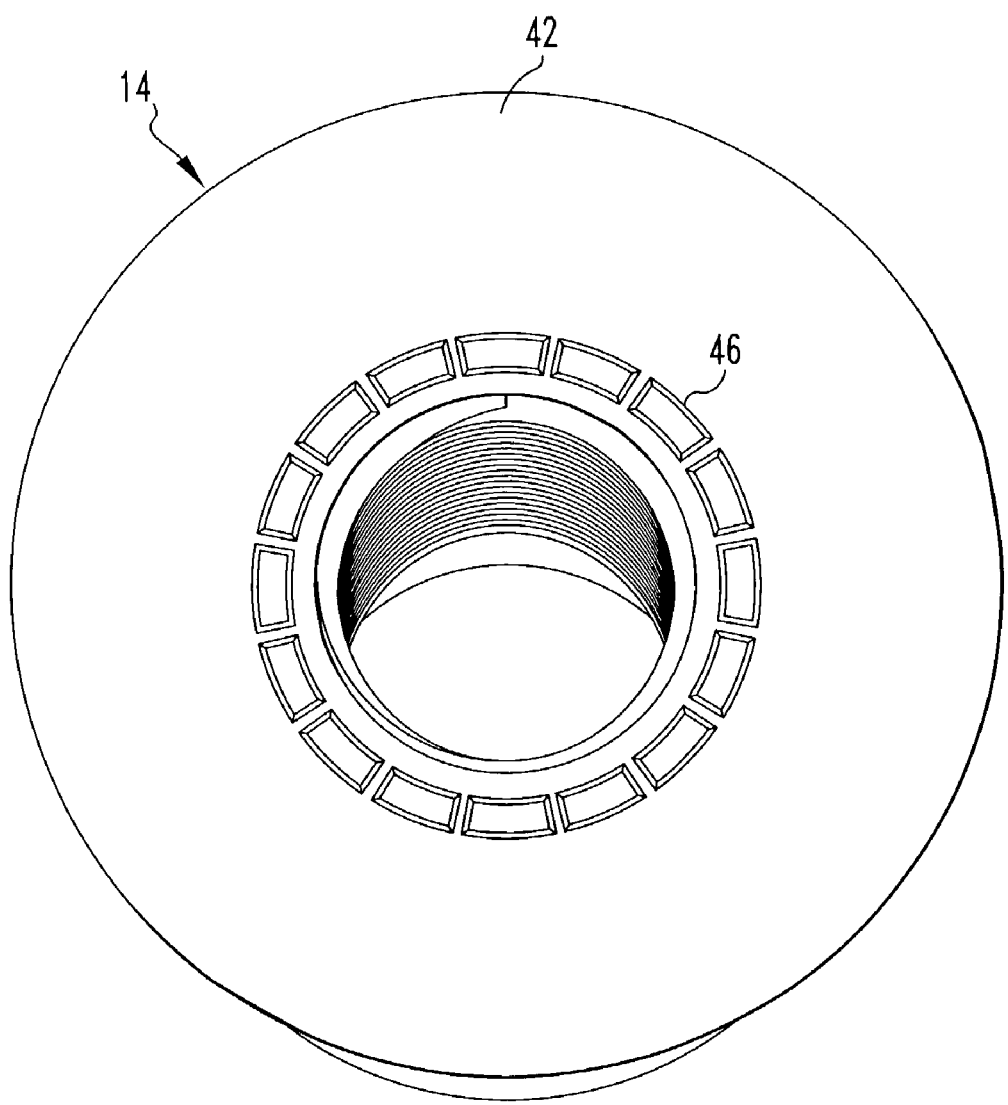
FIG. 3 is a partially offset top plan view to enlarged scale of the head of the sleeve of the present invention with a plurality of recesses disposed in the head of the sleeve.

The sleeve 14 has a body that has a cylindrical shape with a smooth exterior surface that has a slight clearance fit through the openings 20 and 22 of the workpieces 24 and 26. The sleeve 14 also has a head 42 at one end that is typically sunk flush with the outside surface of the accessible side workpiece 24. Alternatively, the head 42 could be protruding from the outer surface of the accessible side workpiece 24. The sleeve 14 has a deformable tail portion 30 at the other end of the sleeve 14 that is an integral component of the sleeve 14 and is made of malleable material. A portion of the sleeve 14 is internally threaded and the portion of the sleeve 14 that consists of the deformable tail portion 30 is not internally threaded and has a larger internal diameter than the threaded portion of the sleeve 14. The threaded portion of the sleeve 14 transitions to the deformable tail portion 30 of the sleeve 14 with a step 44. The threads of the sleeve 14 are sized to threadedly cooperate with the threads of the threaded portion 34 and removable pin tail portion 38 of the pin member 12. With reference to FIG. 3, the head 42 of the sleeve 14 has a plurality of recesses 46 disposed thereon that are adapted to receive a plurality of protruding projections 48 of drive nut 16. The plurality of recesses 46 are disposed in the head 42 of the sleeve 14 in a generally circular pattern. The circular pattern is particularly advantageous in that the circular pattern does not weaken the head 42 by using cross recesses.

The drive nut 16 is internally threaded with the threads being sized to threadedly cooperate with the threads of the removable pin tail portion 38 of the pin member 12. The drive nut 16 preferably has the shape of a traditional hexagon nut. The drive nut 16 has an outer surface 50 for engagement by a driving tool (not shown) that prevents rotation of the drive nut 16. The drive nut 16 has a plurality of protruding projections 48 that are adapted to be disposed within the plurality of recesses 46 of the sleeve 14. The projections 48 are made of a non-deformable material, such that the projections 48 will not deform during installation of the fastener 10. The plurality of recesses 46 can be formed in any configuration that allows the head 42 of the sleeve 14 to be engaged with the drive nut 16. For example, the recesses 46 could be in the shape of a hexagon, a square, a cross-slot configuration, or a single slot configuration as long as the projections 48 of the drive nut 16 have a matching configuration.

Figure 4:
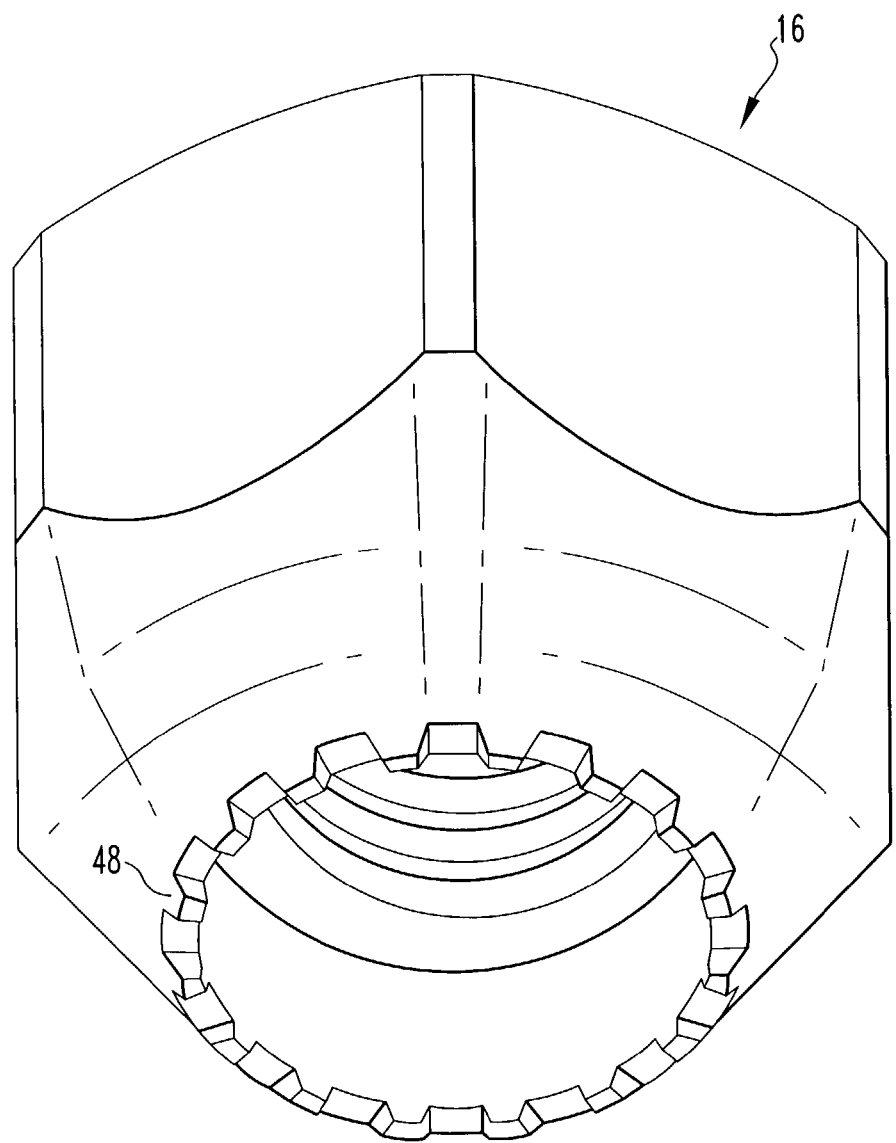
FIG. 4 is bottom perspective view to enlarged scale of the drive nut of the present invention with a plurality of projections disposed on one end of the drive nut.

As with the recesses 46 of the sleeve 14, the number of projections 48 on the drive nut 16 can vary and can be in many different geometrical shapes and forms. The plurality of projections 48 can be formed in any configuration that allows the head 42 of the sleeve 14 to be engaged with the drive nut 16. In FIG. 4, the projections 48 are disposed on the drive nut 16 in a generally circular shape. Alternatively, the projections 48 could be in the shape of a hexagon, a square, a cross slot configuration, or a single slot configuration as long as the recesses 46 of the sleeve 14 have a matching configuration.

Prior to installing the fastener 10 into workpieces 24 and 26, the fastener 10 is assembled. Referring to FIG. 1, the assembly process comprises a series of steps which result in the portion of the sleeve 14 that is threaded being threadedly engaged with the pin member 12. Next, the drive nut 16 is threadedly engaged with the pin member 12 and is positioned so that the projections 48 are aligned and disposed within the recesses 46 of the sleeve 14. Next, the body of the sleeve 14 undergoes a dimpling process (not shown) wherein a small portion of an outer surface of the body of the sleeve 14 is physically deformed against the pin member 12. The dimpling process results in a small portion of the sleeve 14 material being displaced against the pin member 12 to cause sufficient engagement to prevent loosening of the pin member 12 from vibration after installation. The assembly process of the fastener 10 is then complete and the fastener 10 is prepared for installation. In an alternate embodiment, the sleeve 14 can undergo the dimpling process prior to assembly of the fastener 10.

The installation of the assembled fastener 10 involves the fastener 10 being used to secure a plurality of workpieces 24 and 26 together. The fastener 10 is inserted through aligned openings 20 and 22 in the workpieces 24 and 26 wherein the head 42 of the sleeve 14 is received against the outer surface of the accessible side workpiece 24, and a portion of the deformable tail portion 30 of the sleeve 14 extends out from the workpiece 26 and is adjacent to the outer surface of the blind side workpiece 26.

An installation tool (not shown) is adapted to simultaneously have fitting engagement with both the drive nut 16 and the flats 40 of the pin member 12. The installation tool is placed onto the drive nut 16 and creates an engagement that prevents the drive nut 16 from rotating. Accordingly, the sleeve 14 is also prevented from rotating because the projections 48 of the drive nut 16 are engaged with the recesses 46 of the sleeve 14. The installation tool also engages the flats 40 of the pin member 12 and provides a rotational torque on the pin member 12.

As the installation tool rotates the pin member 12 and holds the drive nut 16 and sleeve 14 stationary, it is significant to note that there is no abrading or scratching of the head 42 of the sleeve 14 caused by the drive nut 16. Due to the engagement between the projections 48 and the recesses 46, no slipping of the sleeve 14 relative to the drive nut 16 can occur. The projections 48 are non-deformable and, as a result, provides consistent and predictable results and no slipping between the sleeve 14 and the drive nut 16.

Figure 2:
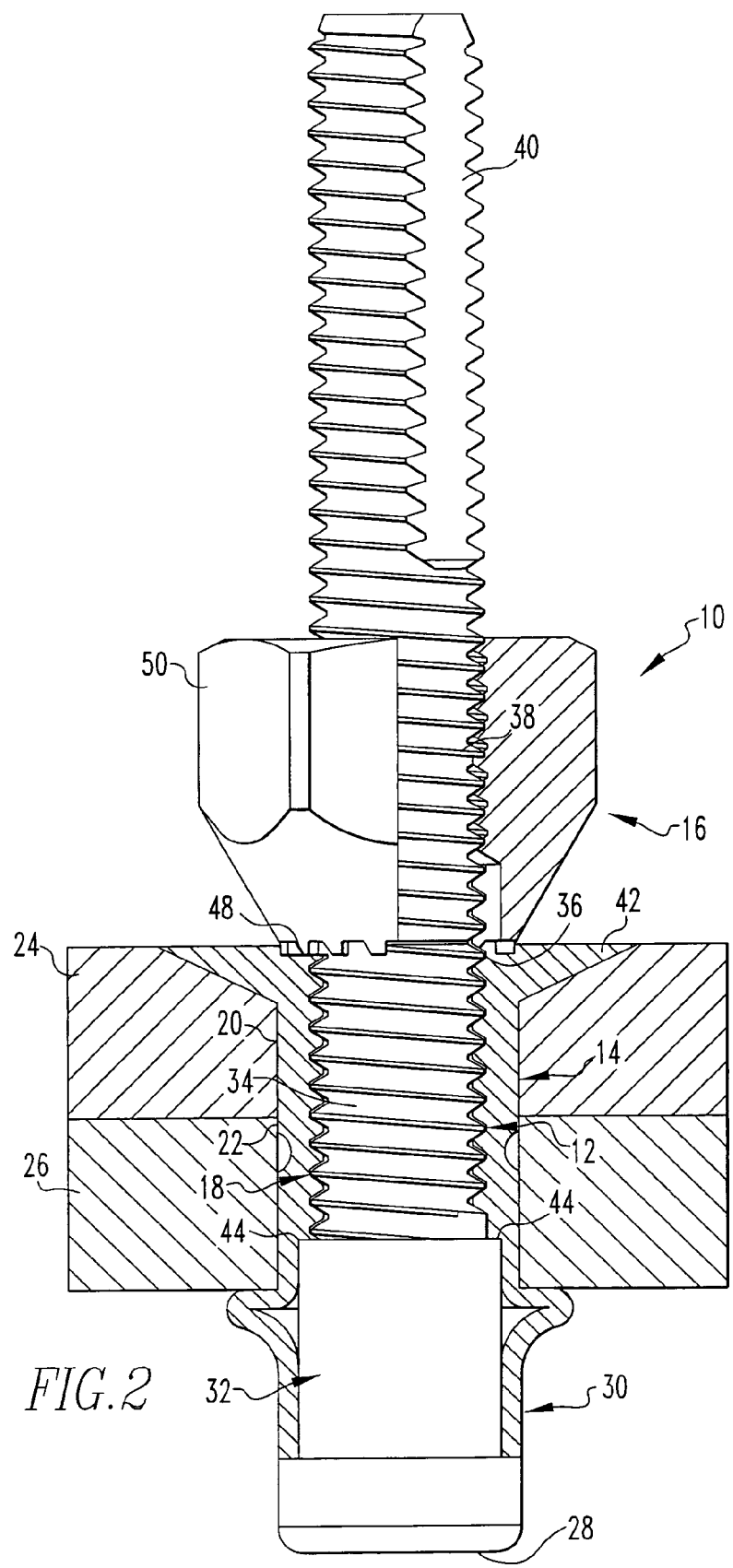
FIG. 2 is a partial cross-sectional side view of the fastener of the present invention showing the components of the fastener after the fastener has been inserted through aligned openings in a plurality of workpieces and has been set.

The installation load applied by the installation tool results in the head 28 of the pin member 12 being drawn towards the deformable tail 30 of the sleeve 14 and the blind side workpiece 26. Since the deformable tail 30 is made of a malleable material, as the head 28 of the pin member 12 engages the deformable tail 30, the deformable tail 30 begins to form a bulb. As shown in FIG. 2, the straight smooth portion 32 of the pin member 12 is disposed within the deformable tail 30 portion and engages the step 44. When the straight smooth portion 32 engages the step 44, the bulb is fully formed and further axial movement of the pin member 12 stops. At this point, torsional load builds up in the pin member 12 and the breakneck groove 36 will fail in torsional shear and break away along with the drive nut 16 that is threadedly engaged with the removable pin tail 38. The remaining portion of the pin member 12 is flush with the outer surface of the head 42 of the sleeve 14. Also, the drive nut 16 breaks away with the removable pin tail 38 without any damage to the head 42.

The bulb formed by the deformable tail 30 of the present invention has the advantage of having the sleeve 14 absorb the buckling load resulting from bulb formation whereas the separate deformable sleeve component of U.S. patent application Ser. Nos. 09/825,711, 09/849,184 and 09/997,500 may have the workpieces 24 and 26 absorb the buckling load resulting from bulb formation that could lead to damage of the workpieces 24 and 26. The deformable tail 30 that forms the bulb also has the benefit of not turning on the pin member 12 during installation of the fastener 10 whereas the separate deformable sleeve component of U.S. patent application Ser. Nos. 09/825,711, 09/849,184 and 09/997,500 may turn during fastener installation which can result in damage to the blind side workpiece by rotation of the separate sleeve relative to the workpiece.

In another embodiment of the invention, the drive nut 16 could have a smooth unthreaded internal bore. The drive nut 16 would be placed onto the removable pin tail portion 38 and secured to the removable pin tail 38 through the use of an O-ring, a retaining ring or a plug (not shown) which is placed on the end of the drive nut 16 that opposes the plurality of projections 48. Preferably, such an O-ring, retaining ring or plug would have an internally threaded bore that threadedly engages the removable pin tail 38. In another embodiment of the invention, the smooth bore drive nut 16 could be affixed to the removable pin tail 38 by deforming the end of the drive nut 16 that opposes the plurality of projections 48 against the threads of the removable pin tail 38 by staking the drive nut 16 to the removable pin tail 38 as is known in the art. As can be appreciated by one of ordinary skill in the art, any other number of separate components could be devised for securing the smooth bore drive nut 16 to the removable pin tail 38 or deforming a portion of the smooth bore drive nut 16 to engage the removable pin tail 38. The process of securing workpieces 24 and 26 together with the blind fastener 10 of the instant invention along with a smooth bore drive nut 16 would be identical to the process described for a threaded bore drive nut 16 except for the nuances mentioned in this paragraph with respect to securing the smooth bore drive nut 16 to the removable pin tail 38. For the sake of being concise, that process will not be repeated here it being understood that the process is the same except for the manner in which the smooth bore drive nut 16 is affixed to the removable pin tail 38.

Having described the presently preferred embodiments of the invention, it is to be understood that the invention may be otherwise embodied within various functional equivalents disclosed within the scope of the appended claims.

What is claimed is:

1. A blind type fastener for securing a plurality of workpieces, comprising:
    (a) a one piece sleeve having a body that is internally threaded along a portion of the sleeve body integrally connected to the sleeve, a head positioned at one end of the sleeve integrally connected to the sleeve and a deformable tail portion positioned at an opposite end of the sleeve integrally connected to the sleeve, the threaded portion of the sleeve transitioning to the deformable tail portion of the sleeve with a step, the head of the sleeve having a plurality of recesses disposed in the head of the sleeve in the general shape of a circle and the deformable tail portion having an internal surface that is smooth;
    (b) a pin member having an elongated shank, the shank having a straight smooth portion received within the deformable tail portion and a threaded portion threadedly engaging the sleeve, the pin member having a head positioned at one end of the pin member, the threaded portion of the pin member having a breakneck groove that separates the pin member into a portion that remains with the fastener after being set and a removable pin tail portion that is removed from the fastener after being set, the breakneck groove fracturing at a position that is flush in substantially all grip ranges of the fastener with an outer surface of the head of the sleeve after being set;
    (c) a drive nut having a bore that is positioned on the removable pin tail portion of the pin member and has a plurality of projections positioned on one end of the drive nut in the general shape of a circle that are disposed in the plurality of recesses disposed in the head of the sleeve; and
    (d) a plurality of dimples disposed on the body of the sleeve to physically engage a portion of the sleeve with the pin member,
    wherein torque applied to the pin member with an installation tool turns the pin member until the deformable tail has formed a bulb and the straight smooth portion has engaged the step of the sleeve thereby stopping further movement of the pin member, the breakneck groove of the pin member moving to a position that is flush in substantially all grip ranges of the fastener with the outer surface of the head of the sleeve and continued torque applied to the pin member while holding the drive nut against rotation twists off the removable pin tail portion of the pin member at the breakneck groove with the drive nut still positioned on the removable pin tail portion of the pin member such that the pin member does not need to be shaved in substantially all grip ranges of the blind fastener after being set.

2. The blind fastener of claim 1 wherein the plurality of projections are made of a non-deformable material.

3. The blind fastener of claim 1 wherein the removable pin tail is threaded, the bore of the drive nut is threaded and the drive nut is threadedly engaging the threads disposed on the removable pin tail.

4. The blind fastener of claim 1 wherein the pin member has a plurality of flats positioned on the removable pin tail portion.

5. A method of securing workpieces having aligned openings using a fastener comprising:
    (a) a one piece sleeve having a body that is internally threaded along a portion of the sleeve integrally connected to the sleeve, a head positioned at one end of the sleeve integrally connected to the sleeve and a deformable tail portion positioned at an opposite end of the sleeve integrally connected to the sleeve, the threaded portion of the sleeve transitioning to the deformable tail portion of the sleeve with a step, the head of the sleeve having a plurality of recesses disposed in the head of the sleeve and the deformable tail portion having an internal surface that is smooth;
    (b) a pin member having an elongated shank, the shank having a straight smooth portion received within the deformable tail portion and a threaded portion threadedly engaging the sleeve, the pin member having a head positioned at one end of the pin member, the threaded portion of the pin member having a breakneck groove that separates the pin member into a portion that remains with the fastener after being set and a removable pin tail portion that is removed from the fastener after being set, the breakneck groove fracturing at a position that is flush in substantially all grip ranges of the fastener with an outer surface of the head of the sleeve after being set; and (c) a drive nut having a bore that is positioned on the removable pin tail portion of the pin member that has a plurality of projections positioned on one end of the drive nut that are disposed in the plurality of recesses disposed in the head of the sleeve; and (d) a plurality of dimples are disposed on the body of the sleeve that deform the body of the sleeve to physically engage a portion of the sleeve with the pin member, the method comprising:

(i) inserting the fastener through aligned openings in the workpieces to be fastened together until the head of the sleeve engages the outer surface of the accessible side workpiece;

(ii) gripping an outer surface of the drive nut to hold the drive nut against rotation relative to the sleeve;

(iii) applying torque to the pin member thereby turning the pin member until the deformable tail has formed a bulb and the straight smooth portion has engaged the step of the sleeve thereby stopping further movement of the pin member, the breakneck groove of the pin member moving to a position that is flush in substantially all grip ranges of the fastener with the outer surface of the head of the sleeve; and (iv) continuing to apply torque to the pin member while holding the drive nut against rotation, thereby twisting off the removable pin tail portion of the pin member at the breakneck groove with the drive nut still positioned on the removable pin tail portion of the pin member such that the pin member does not need to be shaved in substantially all grip ranges of the blind fastener after being set.

6. The method of claim 5 wherein the plurality of recesses and the plurality of projections are in the general shape of a circle.

7. The method of claim 5 wherein the plurality of projections are made of a non-deformable material.

8. The method of claim 5 wherein the removable pin tail is threaded, the bore of the drive nut is threaded and the drive nut is threadedly engaging the threads disposed on the removable pin tail.

* * * * *